J. F. REUSS.
GUARD FOR CULTIVATORS.
APPLICATION FILED DEC. 2, 1912.

1,057,275.

Patented Mar. 25, 1913.

WITNESSES
H. E. Barry
C. E. Trainor

INVENTOR
John F. Reuss
BY Munn & Co.
ATTORNEYS

UNITED STATES PATENT OFFICE.

JOHN FREDERICK REUSS, OF KANKAKEE COUNTY, ILLINOIS.

GUARD FOR CULTIVATORS.

1,057,275.  Specification of Letters Patent.  Patented Mar. 25, 1913.

Application filed December 2, 1912. Serial No. 734,503.

*To all whom it may concern:*

Be it known that I, JOHN F. REUSS, a citizen of the United States, and a resident of Kankakee county, State of Illinois, have invented a new and useful Improvement in Guards for Cultivators, of which the following is a specification.

My invention is an improvement in guards for cultivators, and has for its object the provision of mechanism for preventing the corn from being over-run by the wheels of the cultivator during the cultivation after the corn has reached a certain height and in cases where stalks have been blown over or where the stalks lean in the row, and which may be applied to any ordinary form of cultivator, without essential changes in the cultivator mechanism.

Figure 1:
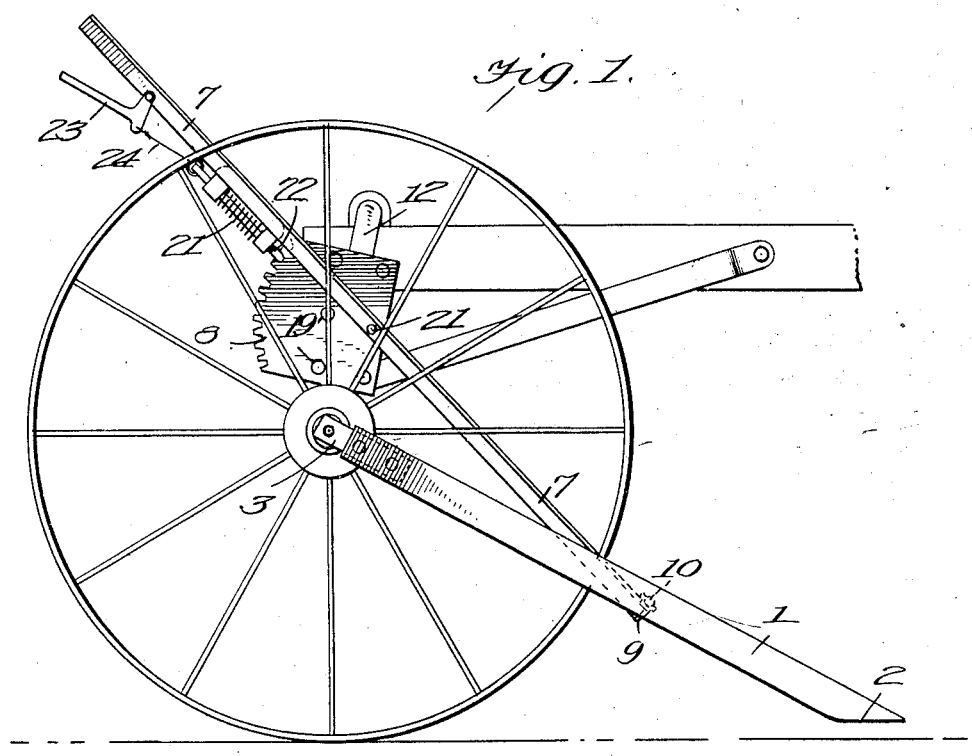
Figure 2:
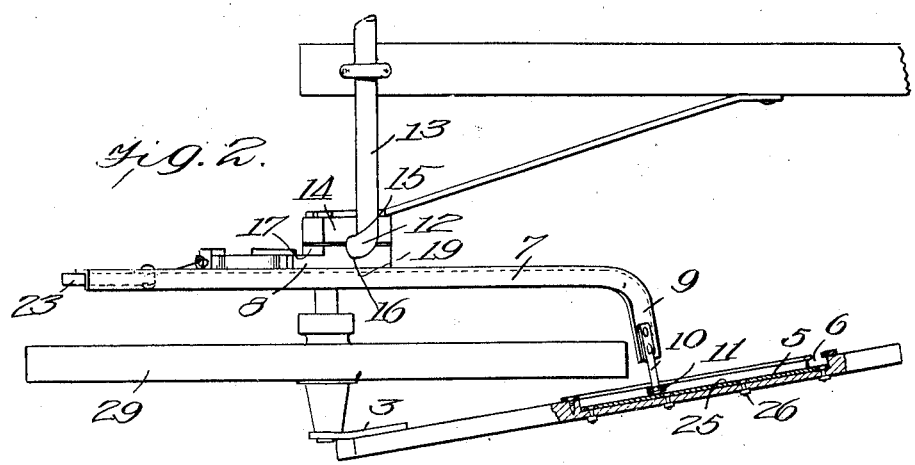
Figure 3:
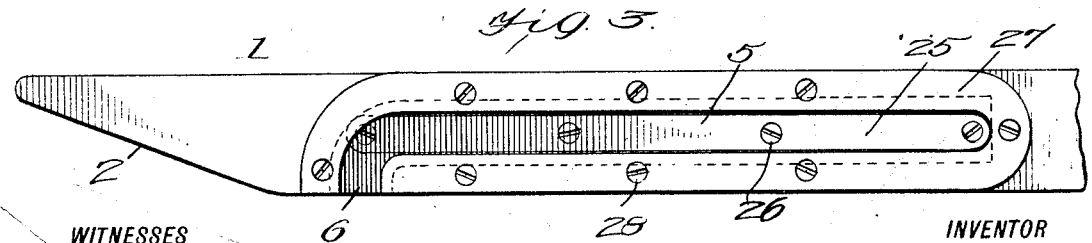

In the drawings:—Figure 1 is a partial side view of a portion of a cultivator provided with the improved guard in place, Fig. 2 is a partial plan view of the guard and its operating mechanism, a portion of the guard being in section, and Fig. 3 is a partial end view partly in section.

The present embodiment of the invention comprises a guard in the form of a bar 1, having one of its ends beveled as shown at 2, and to the other end is secured a bearing lug 3, having an opening for connection with the spindle in a manner to be described, the guard being thus pivoted on the spindle.

The guard is provided with a longitudinally extending groove or recess 5 on its inner face at the end adjacent to the beveled end, the groove having under-cut side walls, and the said groove opens at one side of the guard as shown at 6 at the beveled end.

A lever 7 is provided for operating the guard, the lever being pivoted intermediate its ends to a toothed segment 8 to be described and having at one end an angular arm 9, provided with a stem 10 at its free end, the stem having a head 11. The head is arranged to enter and fit the groove 5, entering the groove through the lateral opening 6 and the head is movable in the groove, but cannot be disengaged therefrom except through the lateral opening 6.

The segment 8 is secured to one of the arms 12 of the arch bar 13, by means of a plate 14. The said plate 14 is provided on its outer face with a longitudinal groove 15, coöperating with a similar groove 16, extending transversely of the segment 8 at the end thereof remote from the teeth. The segment is thickened at the said end as shown at 17, and the thickened portion of the segment and the plate 14 are provided with registering openings for receiving bolts 19 to secure the plate and the segment together.

The plate 14 is arranged on the inner side of the arm of the arch bar, and the segment on the outer side, the said arm being received in the registering grooves 15—16 and held on the arm by means of the bolts 19. An opening is provided in the segment for the bolt 21 that pivotally connects the lever to the segment. The lever is provided with a sliding latch 22, for engaging the teeth of the segment and the latch is operated by means of a grip or latch lever 23 pivoted to the lever 7, and connected to the latch by means of a link 24. A spring 21 normally presses the latch toward the teeth.

The guard 1 swings on the spindle to which it is pivoted, and the free beveled end thereof may be adjusted by means of the lever 7. When the latch 22 is released from the teeth of the segment, it will be evident that the lever may be swung to raise or lower the free end of the guard, the head 11 sliding in the groove 5. In case the guard 1 is made of wood, the bottom of the groove 5 is reinforced with a metal plate 25, secured in place by screw bolts 26 and the edge of the groove is also reinforced by a plate 27, secured to the guard by screw bolts 28.

The improved guard may be attached to cultivators having a grease cup at the end of the spindle, merely by drilling an opening through the grease cup and in the end of the axle, threading the said opening and using a set screw which passes through the opening of the bearing lug 3 on the guard, and engages the threaded opening. The guard may be connected with the spindle in any suitable manner, the manner of connection depending upon the make of the cultivator. The only essential is that the guard be free to swing with respect to the spindle, in order that the free end thereof may be adjusted.

It will be observed that the guard is outside the wheel 29 of the cultivator, the angular portion 9 of the lever extending transversely of the wheel. When the stalks are down, the pointed end of the guard will pass beneath the same, and the stalks will ride up the guard and up the wheel, thus preventing their being broken by the wheel. The device may be arranged on both wheels if desired, and when not in use, may be adjusted into inoperative position by means of the lever, or the entire device may be removed from the machine.

In operation, as the cultivator passes through the corn, the fallen stalks will be engaged by the guard and will be lifted and pushed to one side to prevent their being run over and broken off by the wheel. The guard is of sufficient length to extend from the spindle to a point in front of the wheel, as shown in Fig. 1. The outer ends of the openings 18 of the segment are preferably countersunk, the countersink being square in cross section to prevent rotation of the bolts.

I claim:—

1. In combination with the cultivator, of a guard for lifting fallen stalks, said guard comprising a bar pivoted at one end to the end of the spindle and having the other end beveled on its lower edge, said bar having a longitudinally extending undercut groove on its inner face, said groove having a lateral outlet at the lower edge of the bar adjacent to the beveled end, a toothed segment having means for connecting the same to the arch of the cultivator, a lever pivoted intermediate its ends to the segment and having at its lower end an angular portion provided at its free end with a reduced stem and with a head at the free end of the stem, the head moving in the undercut groove, and latch mechanism in connection with the lever for engaging the teeth of the segment to hold the lever in adjusted position.

2. In combination with the cultivator, of a guard for lifting fallen stalks, said guard comprising a bar pivoted at one end to the end of the adjacent spindle and having the other end beveled on its lower edge, said bar having a longitudinally extending undercut groove on its inner face, the groove having a lateral outlet at the lower edge of the bar adjacent to the beveled end, the guard being outside of the wheel, a lever inside the wheel and having an angular portion provided with a head for engaging the groove, means for pivotally connecting the lever intermediate its ends to the frame of the cultivator, and means for holding the lever in adjusted position.

3. In combination with the cultivator, of a guard for lifting fallen stalks, said guard comprising a bar pivoted at one end to the end of the adjacent spindle and having the other end beveled on its lower edge, said guard being outside the wheel, a lever inside the wheel and slidably connected with the guard near the beveled end, means for pivotally connecting the lever to the frame of the cultivator, and means for holding the lever in adjusted position.

4. In combination with the cultivator, of a guard for lifting fallen stalks, said guard comprising a bar pivoted at one end to the spindle outside the wheel, a lever inside the wheel and having a slidable connection with the bar near its free end at one end of the lever, and means for pivotally connecting the lever to the frame of the cultivator intermediate the ends of the lever.

5. A guard of the character specified, comprising a bar having means at one end whereby it may be pivoted to the spindle of a cultivator, a lever having a slidable connection at one end with the bar near the other end thereof, and means for pivotally connecting the lever to the cultivator.

JOHN FREDERICK REUSS.

Witnesses:
Louis G. Spies,
William Allsteadt.